Dec. 15, 1959 J. W. HILL 2,917,259
CABLE TRAY
Filed Aug. 2, 1954 3 Sheets-Sheet 1
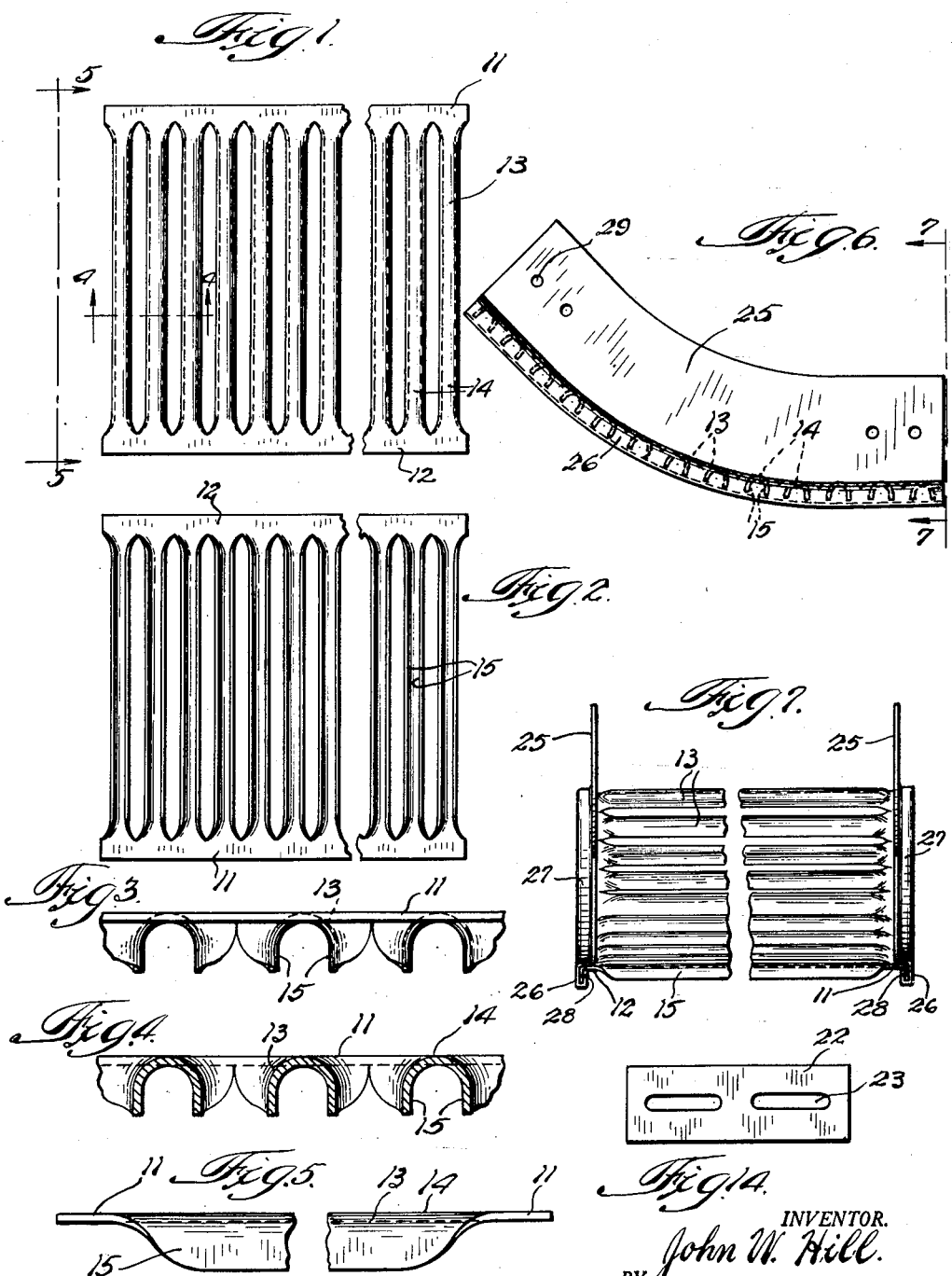
INVENTOR.
John W. Hill.
BY
Thiess, Olson, Mecklenburger,
von Holst, & Coltman.

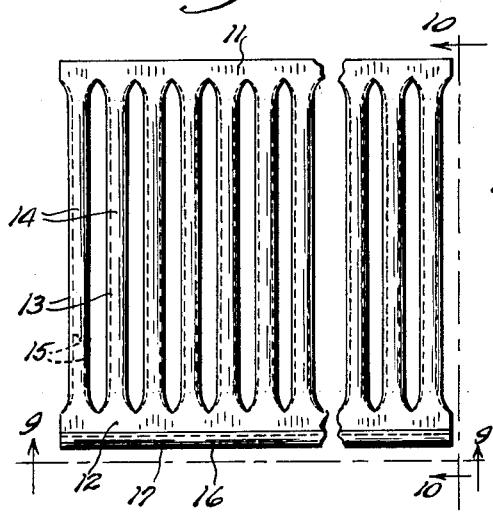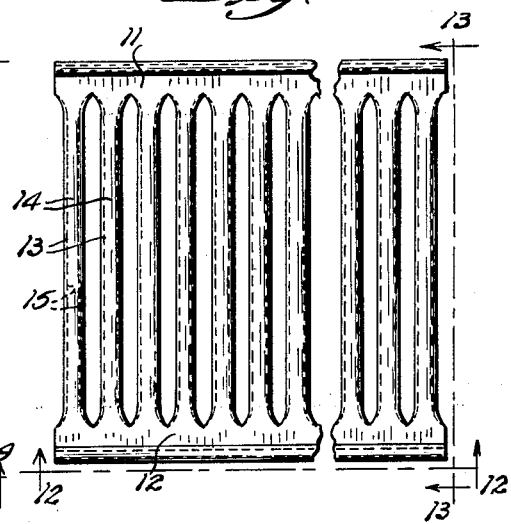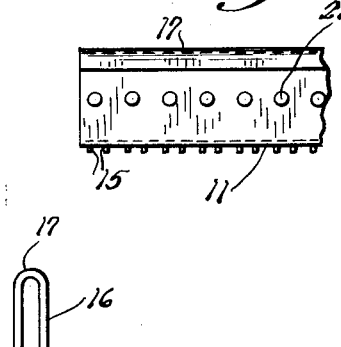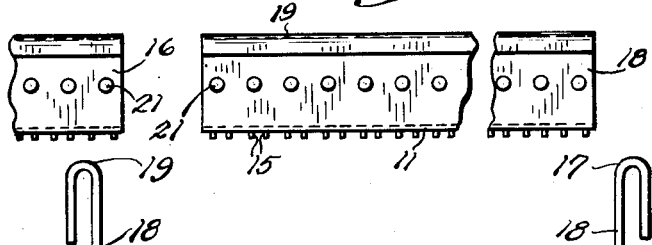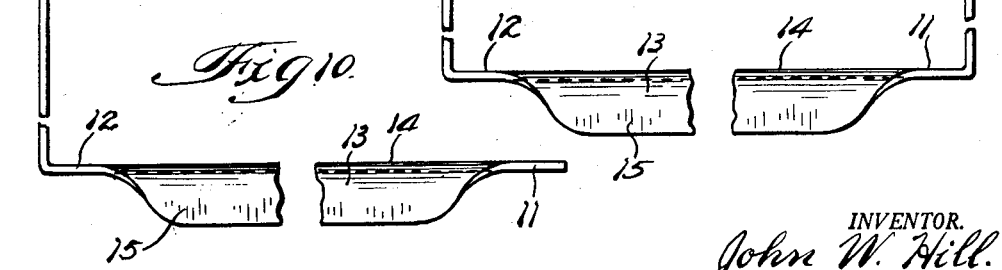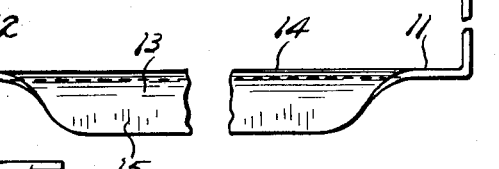

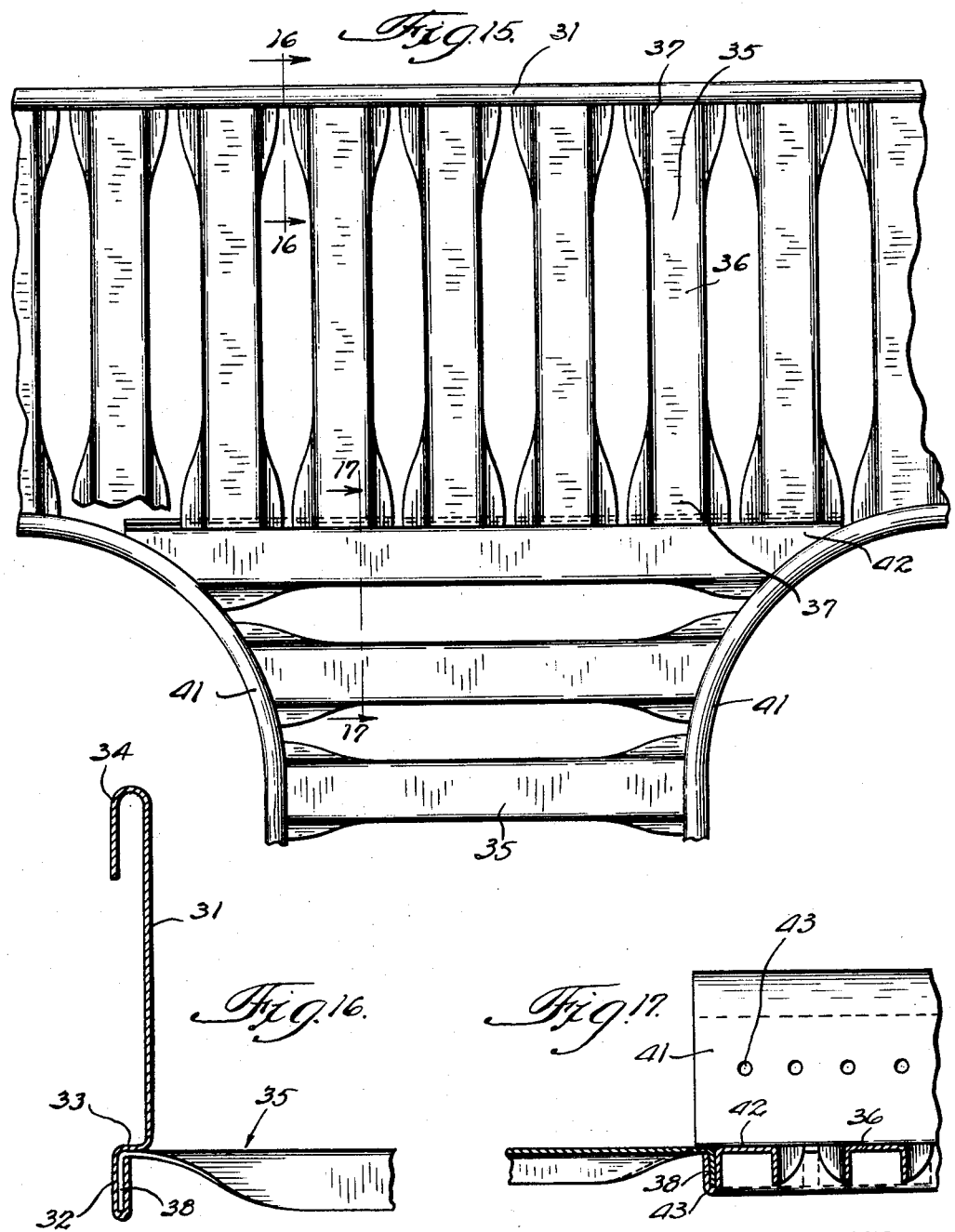

United States Patent Office 2,917,259
Patented Dec. 15, 1959

2,917,259

CABLE TRAY

John W. Hill, Chicago, Ill., assignor to The Globe Company, Chicago, Ill., a corporation of Illinois Application August 2, 1954, Serial No. 447,161

4 Claims. (Cl. 248—68)

The present invention relates to supports for wires, cables and other conductors and has special reference to trays or shelves therefor. More particularly, the present invention relates to cable trays or shelves for use in electric generating plants, telephone exchanges, etc., to support large numbers of conductors such as cables, wires, conduits, pipes and tubes.

The trays of the present invention may be formed integrally or assembled from individual parts and are preferably trough-shaped, with side members or flanges on both sides for the purpose of maintaining the conductors in place and providing longitudinal strength. However, the side members may be omitted from one or both sides such as when intended to be used in the formation of junctions such as T's or Y's. Moreover, the trays and their associated parts may be curved both horizontally and vertically to meet any requirements.

An object of the present invention is to provide a tray or shelf for supporting a large number of wires, cables, or other conductors, which is free of any edges or corners that might damage the conductors supported thereon. In the present trays or shelves the bottom portions on which the conductors rest are formed of inverted substantially U-shaped channel members extending transversely between preferably imperforate marginal portions. The conductors rest on the upper rounded surfaces or flat surfaces with rounded sides or edges without any likelihood of injury despite substantial movement of the conductors.

It is another object of the invention to provide trays or shelves which will permit circulation of air about the conductors to dissipate any heat given off thereby. This is accomplished in the present trays by spacing the inverted channel members to provide openings therebetween for the circulation of air.

A further object is to provide trays or shelves of the above type having high transverse and longitudinal strength. The transverse inverted channel members extending between the side marginal portions provide high transverse strength preventing sagging of the trays intermediate the side margins despite heavy loads placed thereon. The longitudinal strength of the trays is largely provided by the tray sides which extend upwardly from the bottom, preferably at both sides thereof. As it is frequently desirable to raise or lower the cables from one level to another or to bend them in a horizontal plane, it is also an object of the present invention to provide trays or shelves which may be shaped for providing changes in direction, either horizontally or vertically.

An additional object is to provide trays of the above type which may be formed integrally or may be assembled from individual parts.

A still further object is to provide a tray of the above type which may be readily produced at a relatively low cost.

Further objects and advantages will be apparent from the following description and claims when considered with the drawings in which:

Figure 1 is a top plan view of an integral cable tray or shelf embodying the present invention without any side members or flanges;

Fig. 2 is a bottom plan view of the tray shown in Fig. 1;

Fig. 3 is a side elevational view of the tray shown in Fig. 1;

Fig. 4 is a cross-sectional view taken on the line 4—4 of Fig. 1;

Fig. 5 is an end elevational view of the tray shown in Fig. 1 looking in the direction of the arrows 5—5 of Fig. 1;

Fig. 6 is a side elevational view of an upwardly curved tray or elbow embodying the present invention;

Fig. 7 is an end elevational view of the tray portion shown in Fig. 6 looking in the direction of the arrows 7—7 of Fig. 6;

Fig. 8 is a top plan view of an integral tray portion having a side member or flange at one side thereof;

Fig. 9 is a side elevational view of the tray shown in Fig. 8 looking in the direction of the arrows 9—9 of Fig. 8;

Fig. 10 is an elevational view of the tray shown in Fig. 8 looking in the direction of the arrows 10—10 of Fig. 8;

Fig. 11 is a top plan view of an integral tray or shelf having side flanges or members at both sides thereof;

Fig. 12 is a side elevational view thereof of the tray shown in Fig. 11;

Fig. 13 is an end elevational view of the tray shown in Fig. 11;

Fig. 14 is an elevational view of a splice plate for fastening sections of trays or shelves together;

Fig. 15 is a top plan view of a T assembled from separate parts;

Fig. 16 is a cross-sectional view taken on the line 16—16 of Fig. 15, and

Fig. 17 is a cross-sectional view taken on line 17—17 of Fig. 15.

Referring to the drawings, and more particularly to Figs. 1 through 5, there is shown an integral cable tray or shelf embodying the present invention having no side members or flanges. This tray or shelf comprises longitudinal extending marginal portions 11 and 12 at opposite sides of the tray or shelf with transverse connecting members 13 extending between the side margins 11 and 12.

The transverse members 13, as shown particularly in Figs. 3, 4 and 5, may be in the form of inverted substantially U-shaped channel members having smooth, rounded upper surfaces 14. The lower portions of the opposed sides 15 of each of the channel members 13 are substantially normal to the plane of the shelf or tray and thereby provide high transverse strength preventing bending or sagging of the transverse channel members even when heavy loads are supported thereon.

The opposed sides 15 of the channel members slope upwardly at their ends and merge into the integral side marginal portions 11 and 12. In the preferred form of the present invention, the upper surfaces of the transverse channel members 13 lie substantially in the plane of the upper surfaces of the side marginal portions. However, if desired, the upper surfaces of the transverse members 13 may be above the marginal portions 11 and 12, or, for certain special purposes, may even be therebelow.

In forming the shelves or trays shown in Figs. 1 through 5, a sheet of suitable material, preferably metal such as steel or aluminum, is first slitted transversely the full distance between the marginal portions 11 and 12. The slits are preferably normal to the marginal portions and are also parallel and spaced a distance apart. Thereafter, the marginal portions 11 and 12 and the portions midway between the slits are supported while the material adjacent the slits is forced downwardly, thus producing a shelf or tray such as is shown in Figs. 1 through 4, which has substantially the same outer dimensions as the blank or sheet from which it is made.

In Figs. 8, 9 and 10 there is shown a shelf or tray, similar to that of Figs. 1 through 5, with the addition of a side portion or flange 16 at one side thereof. In this form the side portion or flange 16 is preferably made integral with the rest of the shelf or tray and extends upwardly, preferably substantially normal to the plane of the shelf or tray any desirable distance such, for example, as three or four inches. The upper edges of the side portions or flanges are preferably bent outwardly and downwardly forming a hook or loop 17 which may fit over rods, hangers or other support, either suspended from the ceiling or mounted on the floor to support the trays or shelves in proper position. The side portions 16, being substantially normal to the plane of the shelf or tray, also provide high longitudinal strength.

Referring to Figs. 11, 12 and 13, there is shown another integral form of shelf or tray in which side portions or members 18 are formed at both sides of the tray, extending upwardly, preferably substantially normal to the plane of the shelf or tray from the outer edges of the marginal portions 11 and 12. The upper edges of the side members 19 are also provided with hooks or loops similar to the loops 17.

The form of shelf or tray having side portions at both sides is the preferred form for normal usage. The side members 18 serve as strengthening ribs or members at each side of the shelf and also provide means for supporting the opposite sides thereof. They may be made integral with the rest of the tray, as shown in Figs. 11, 12 and 13. This is accomplished during the formation of the tray from a blank or sheet by leaving unslitted portions outwardly of the marginal portions 11 and 12 which may thereafter be bent into the desired shape, as illustrated.

While the trays may be made of suitable lengths, it is generally necessary to arrange a plurality of trays adjacent each other and connected together into a unitary structure. To accomplish this, the side portions 16 and 18 are provided with a series of aligned, longitudinally extending, evenly spaced perforations 21. The side portions of adjacent members may then be connected by splice plates 22, such as that shown in Fig. 14. The splice plate 22 may be oblong in shape and is provided with elongated openings 23 adjacent each end thereof having a length preferably greater than the distance between adjacent openings 21 in the side members 16 and 18.

In connecting two tray sections together bolts having smooth, round, relatively flat heads are arranged to extend outwardly through the openings 21 in the side members of adjacent tray sections and through the openings 23 in a splice plate 22. When nuts are threaded onto the outer ends of the bolts, the tray sections are held securely together and, due to the smooth bolt heads, there is no likelihood of any injury to conductors coming in contact therewith.

Constructions of any desired length may be formed by connecting severed portions of trays to full sized trays. For this purpose a portion of a tray may be severed by cutting through the marginal portions 11 and 12 at opposite ends of an elongated opening between adjacent transverse members 13 and through the side members outwardly thereof. The severed portion is then connected to a tray by the use of the splice plates 22.

It is frequently necesary or desirable to change the direction of the cables in a horizontal plane. Suitable constructions such as curves, T's or Y's can be employed for this purpose. In constructing T's and Y's, it may be desirable to employ integral shelf or tray portions having only one side flange, such as shown in Figs. 8 through 10, or shelf portions having no side portions, such as shown in Figs. 1 through 6. Various supporting plates may be used for such junctions. It is also possible to combine plates which are preferably in the shape of a segment of a circle in conjunction with the shelves or trays disclosed herein to form curved structures. Where desired, side flanges similar to those shown in Figs. 8 through 13 may be secured to the curved structures.

It may also be desirable to carry the conductors supported by the trays from one horizontal level to another. For this purpose integral elbows or vertically-curved trays, such as shown in Figs. 6 and 7, may be employed. These elbows may be produced by first forming a sheet or tray portion of the type disclosed in Fig. 1, and then bending the side margins to give the desired curvature thereto. Thereafter, suitably shaped side members 25 may be secured to the tray portion.

The side members 25 are preferably provided with lower outwardly offset portions 26 forming shelf portions 27 which rest on the upper surfaces of the margins 11 and 12 at the opposite sides of the shelf or tray. The margins 11 and 12 are preferably made wide enough so that they may be bent downwardly, as indicated at 28 in Fig. 7. The lower offset portions 26 of the sides 25 are return bent about the downwardly projecting marginal portions 28 and tightly clamped thereabout. The sides 25 are also preferably provided with suitable perforations 29 to permit them to be connected to the side portions of other trays by the splice plates 22. This forms a very strong rigid construction completely devoid of any sharp edges that might injure the conductors or conduits supported thereon.

Instead of forming the cable or conduit supporting material integrally, such as shown in Figs. 1 through 5 and 8 through 13, the cable or conduit supporting material may be produced by assembling individual transverse members and side members. Referring to Figs. 15 through 17, an assembled construction formed from individual members is disclosed. This may consist of side members 31 similar to the side members 25 previously discussed. The side members 31, as shown particularly in Fig. 16, have a lower offset portion 32 forming a shelf 33 between the upper and lower side portions. The upper edge of the side is also preferably bent outwardly and downwardly forming a hook or loop 34, similar to the hooks or loops 17 and 19, for supporting the trays.

The transverse members 35 are formed individually and have a central channel-shaped portion 36 extending between flattened end portions 37. The central channel-shaped portions 36 are substantially U-shaped in cross section, as shown in Fig. 17. However, instead of having their entire upper surfaces rounded as shown, for example, in Fig. 1, the upper surfaces may be substantially flat with only the sides thereof rounded, as illustrated in Figs. 15 and 17. Also, the sides of the channel-shaped portions are bent upwardly and outwardly adjacent the ends of the transverse members and merge into the flattened end portions 37. It is to be understood that the transverse members 14 and 36 may be similarly shaped with the upper surfaces of the channel portions either largely flat or rounded, provided that the form selected is free of sharp edges upon which the conductors or conduits to be supported might be injured.

The end extremities 38 of the transverse members 35 are bent downwardly, preferably substantially normal to the upper surface of the transverse members. The sides 31 are positioned with the shelf portions 33 overlying the ends of the upper surfaces of the transverse member and the offset portions 33 return bent and tightly clamped about the ends 38. A single side member 31 may be secured to one of the transverse members, or two side members may be employed, depending upon the desired use of the resulting tray or shelf. When in assembled position as shown in Figs. 16 and 17, the shelf portions 33 extend inwardly beyond the point at which the sides of the channel-shaped portions merge into the flattened end portions of the transverse members.

The assembled form of shelf or tray as well as the integral construction may be employed in the formation of T's, Y's and other connecting constructions as well as in straight sections of the general type shown in Figs. 1, 8 and 11. A T formed of individual elements is shown in Fig. 15. This may comprise a straight side member 31 and suitably curved side members 41, both of which preferably have lower offset portions, as shown in Fig. 16, for being clamped about the downwardly extending ends of the transverse members. In order to support the ends of the transverse members 36 forming the crossbar of the T opposite to the ends supported by the side member 31, a special transverse member 42 is employed. This has a return bend 43 at one side secured to the adjacent downwardly projecting flanges 38, as shown in Fig. 17. The remainder of the transverse member 42 is similar to the sides of the transverse members 35. It is also to be noted that it is necessary to employ transverse members 35 in the upright stem of the T with their ends suitably shaped so that they may be secured to the side members 41.

The side members 31 and 41 may be provided with openings 43 similar to the openings 21 in the side members 16 and 18. These openings are so positioned that with a splice plate 22 resting on a shelf 33, the openings 23 in the splice plate will be aligned with the openings 43 in the sides 31 and 41.

The integral shelves or trays of the present invention may be formed readily and with a minimum of effort from a single sheet or blank, or the trays may be readily assembled from individual parts. The completed trays have predictable longitudinal strength between the various points of support. Due to the channel shape of the transverse members 13, high transverse strength is provided preventing any bending or sagging of these members between the side margins. The upper surfaces of the transverse members are smooth and rounded at least on their sides and all of the other portions of the trays with which the cables may come into contact are also free of any edges which might harm or injure the conductors in any way.

Due to the spacing of the transverse members providing openings therebetween, air may circulate up through the bottom of the trays or shelves expediting the dissipation of any heat from the conductors. The openings also prevent the accumulation of any water or moisture therein. Thus, if water falls on the cables in the trays it will rapidly pass down through the cables or other conductors and escape through the bottom of the tray. In the assembled trays suitable spacing between transverse members may be provided.

The upper surfaces of the transverse members preferably lie in a common plane except when they are employed to vary the horizontal position of the conductors. Moreover, the trays may be combined to provide any desirable form of support and may be cut in any desired length, and the various portions, whether cut or uncut, may readily be put together by means of the splice plates. The trays, due to the hooks or loops at the upper portion of the side members, may be supported by hangers from the ceiling or overhead or on suitable racks or other construction resting on the floor or base.

While particular embodiments of this invention have been illustrated and described, it will be understood, of course, that the invention is not to be limited thereto, since many modifications may be made, and it is contemplated, therefore, by the appended claims to cover any such modifications as fall within the true spirit and scope of this invention.

I claim:

1. A substantially T-shaped cable supporting member comprising a plurality of separate substantially parallel transverse supporting members having inverted channel-shaped central portions and wider flattened end portions with the outer ends thereof bent downwardly, a connecting member having an inverted channel-shaped central portion and wider flattened end portions with the outer ends thereof bent downwardly, said connecting member having an upwardly extending flange at one side thereof forming a channel for receiving the downwardly bent ends of the adjacent members, a second group of similar supporting members adjacent and substantially parallel to said connecting member, and upwardly extending side members at the outer ends of said supporting members.

2. A substantially T-shaped cable supporting member comprising a plurality of separate substantially parallel transverse supporting members having inverted channel-shaped central portions and wider flattened end portions with the outer ends thereof bent downwardly, a connecting member having an inverted channel-shaped central portion and wider flattened end portions with the outer ends thereof bent downwardly, said connecting member having an upwardly extending flange at one side thereof forming a channel for receiving the downwardly bent ends of the adjacent members, a second group of similar supporting members adjacent and substantially parallel to said connecting member, and upwardly extending side members having their lower edges return bent and clamped about the downwardly projecting portions of the supporting members and connecting member.

3. A substantially trough-shaped cable tray comprising a plurality of separate substantially parallel transverse supporting members and substantially continuous side members extending upwardly therefrom, said transverse members having inverted channel-shaped central portions and substantially flat end portions of greater width than the central portions with the outer extremities of said end portions bent downwardly substantially 90°, each of said transverse members having the upper portion thereof intermediate said downwardly bent end extremities lying in substantially the same plane, said side members being fixedly connected adjacent their lower ends to opposite end portions of said transverse members, said side members having upper portions and lower substantially parallel portions offset outwardly therefrom and connected thereto by an integral shelf portion susbtantially normal to said upper and lower portions, said side members having said shelf portions resting on the opposite end portions of said transverse members with the lower side portions return bent about said downwardly bent extremities to prevent separation of said transverse and side members.

4. The cable tray of claim 3 with the upper edges of said side members bent over at their upper edges providing hook-shaped supporting means for said tray.

References Cited in the file of this patent

UNITED STATES PATENTS

| | | |
|---|---|---|
| 812,158 | Tuttle | Feb. 6, 1906 |
| 1,176,484 | Otis | Mar. 21, 1916 |
| 1,987,405 | Lundy | Jan. 8, 1935 |
| 2,196,624 | Chester | Apr. 9, 1940 |
| 2,266,543 | Francis | Dec. 16, 1941 |
| 2,662,709 | Ullberg | Dec. 15, 1953 |

FOREIGN PATENTS

| | | |
|---|---|---|
| 675,035 | Great Britain | July 2, 1952 |